US012240331B1

United States Patent
Xu et al.

(10) Patent No.: US 12,240,331 B1
(45) Date of Patent: Mar. 4, 2025

(54) GLOBAL ENERGY MANAGEMENT OPTIMIZATION METHOD IN MULTI-TASK CROSS-CORE DEPLOYMENT FOR HYBRID ELECTRIC VEHICLES

(71) Applicant: BEIHANG UNIVERSITY, Beijing (CN)

(72) Inventors: Xiangyang Xu, Beijing (CN); Junwei Zhao, Beijing (CN); Peng Dong, Beijing (CN); Yanfang Liu, Beijing (CN); Shuhan Wang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 18/587,347

(22) Filed: Feb. 26, 2024

(30) Foreign Application Priority Data

Sep. 27, 2023 (CN) .......................... 202311255135.8

(51) Int. Cl.
  *B60L 15/20* (2006.01)
  *G07C 5/08* (2006.01)

(52) U.S. Cl.
  CPC ....... *B60L 15/2045* (2013.01); *B60L 15/2054* (2013.01); *G07C 5/0841* (2013.01); *B60L 2240/12* (2013.01); *B60L 2240/54* (2013.01)

(58) Field of Classification Search
  None
  See application file for complete search history.

(56) References Cited

U.S. PATENT DOCUMENTS 11,117,475 B2 * 9/2021 Cserna .................. B60W 20/12
11,485,241 B2 * 11/2022 Stephens ................. B60L 53/14
11,936,184 B2 * 3/2024 Reddy ..................... H02J 3/003

FOREIGN PATENT DOCUMENTS

CN  109229091 B  4/2020
CN  113479186 B  10/2021

OTHER PUBLICATIONS

Qureshi et al., "Parallel ADMM for Robust Quadratic Optimal Resource Allocation Problems," 2019 American Control Conference, Jul. 2019, pp. 3402-3407. (Year: 2019).*
Zhu et al., "A Gpu Implementation of a Look-Ahead Optimal Controller for Eco-Driving Based on Dynamic Programming," 2021 European Control Conference, Jun. 2021, pp. 899-904. (Year: 2021).*

* cited by examiner

*Primary Examiner* — Todd Melton
(74) *Attorney, Agent, or Firm* — Jose Cherson Weissbrot

(57) ABSTRACT

A global energy management optimization method in multi-task cross-core deployment for hybrid electric vehicles, belonging to the technical field of hybrid electric vehicle energy management, which is capable of solving the problem that conventional hybrid electric vehicles cannot realize global energy management at a vehicle end; through adopting the present invention, the problems relating to the failure of timely achieving global energy management for hybrid electric vehicles, poor vehicle speed performance and driving safety caused by the high difficulty of effectively connecting and deploying different computing tasks of global energy management are solved; a multi-core heterogeneous controller is used to perform multi-task deployment, which solves the problems caused by one type of tasks requiring high computing power but low real-time response while another type of tasks requiring low computing power but high real-time response, ensures the efficient utilization of control chips of the hybrid transmission.

6 Claims, 1 Drawing Sheet

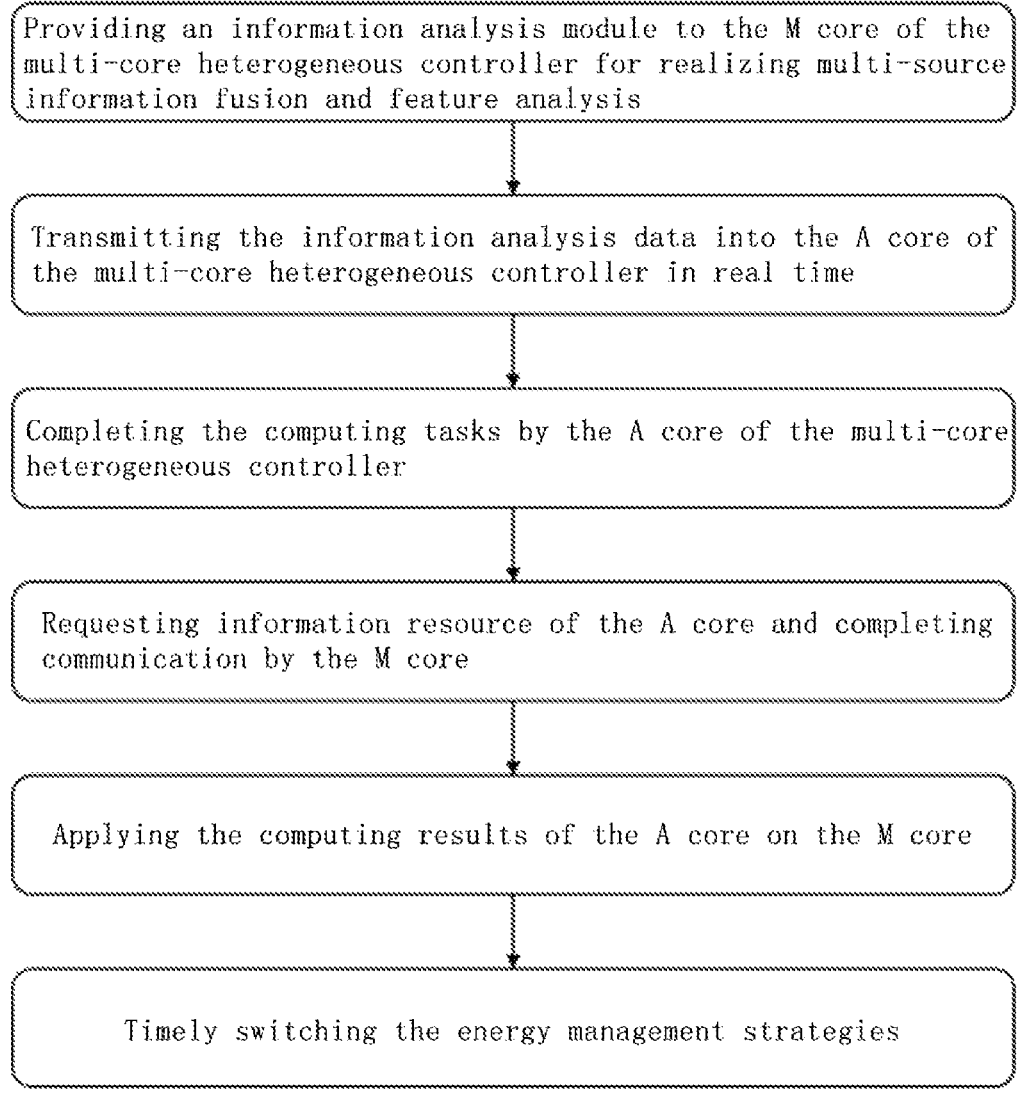

GLOBAL ENERGY MANAGEMENT OPTIMIZATION METHOD IN MULTI-TASK CROSS-CORE DEPLOYMENT FOR HYBRID ELECTRIC VEHICLES

TECHNICAL FIELD

This invention generally relates to the technical field of hybrid electric vehicle energy management, and more particularly, to a global energy management optimization method in multi-task cross-core deployment for hybrid electric vehicles.

BACKGROUND

The key for realizing energy optimization and utilization of hybrid electric vehicles in different driving scenes is that the designed energy management strategy is capable of fully considering the driving cycle information. Presently, there is a large amount of research on the energy management method for hybrid electric vehicles, for example, Chinese patents CN113479186B and CN109229091B.

However, conventional energy management strategies have poor adaptability to operating conditions and fail to predict the influences of future driving scene information on instantaneous decision-making, resulting in the failure of achieving optimization of energy utilization. The implementation of the global energy management strategy relates to multiple computing tasks, including future driving scene recognition, driving cycle prediction, as well as global SoC trace planning and analysis. Due to huge data resources and high computing power demands, conventional technical solutions rely on a vehicle-end, road-end and cloud-end collaboration scheme, which is limited to the problems such as multi-device real-time communication, hybrid transmission control real-time response and driving safety. Particularly, the control response of the hybrid transmission directly affects the vehicle speed performance and driving safety. Therefore, it is urgent for those skilled in the art to provide a technical solution for solving technical problems in the multi-device distribution operation technology.

SUMMARY

The purpose of the present invention is to provide a global energy management optimization method in multi-task cross-core deployment for hybrid electric vehicles, which is capable of solving the problem that conventional hybrid electric vehicles cannot realize global energy management at a vehicle end. Meanwhile, through adopting the present invention, the problems relating to the failure of timely achieving global energy management for hybrid electric vehicles, poor vehicle speed performance and driving safety caused by the high difficulty of effectively connecting and deploying different computing tasks of global energy management are solved.

To achieve the above purpose, the present invention adopts the following technical solution: a global energy management optimization method in multi-task cross-core deployment for hybrid electric vehicles, comprising the steps of:

Step 1: inputting a plurality of pieces of online original information collected by a plurality of environment sensing devices into an M core of a multi-core heterogeneous controller, and performing information sensing and time sequence synchronization alignment, scene-oriented driving speed performance analysis and future driving road segment feature recognition, thereby obtaining information data;

Step 2: transmitting the information data obtained in step 1 to the A core of the multi-core heterogeneous controller in real time, thereby obtaining information data in a valid state;

Step 3: obtaining a target battery power state of charge trace sequence under a future driving road segment based on the multi-source information time sequence synchronization table and the valid information data obtained in steps 1 and 2;

Step 4: waking up the target battery power state of charge trace sequence under the latest future driving road segment;

Step 5: applying the target battery power state of charge trace sequence under a future driving road segment to the M core by the A core, and determining the battery target SoC state in different position interval states in the future driving road segment based on the driving position, driving speed and driving time at a current position of the hybrid electric vehicle, thereby obtaining a target SoC value in a current position state; subsequently, performing hybrid transmission operating mode decision-making and multi-power-source power allocation in combination with the target SoC value in the current position state, thereby generating a global energy management strategy of the hybrid electric vehicle.

Alternatively, step 1 further comprising:

Step 11: inputting the plurality of pieces of online original information collected by the plurality of environment sensing devices into the M core of the multi-core heterogeneous controller, and performing time sequence synchronization alignment, thereby obtaining a multi-source information time sequence synchronization table;

Step 12: extracting a driver's driving speed performance feature data in the historical travel big data at a vehicle end, and obtaining the driver's scene-oriented driving speed performance matrix;

Step 13: integrating the multi-source information time sequence synchronization table and the driver's driving speed performance feature data, thereby obtaining the information data for future driving road segment feature recognition.

Alternatively, in step 2, obtaining information data in a valid state further comprising: detecting the information status flags by the A core, and determining the validity of the received information data by using the information status flags, thereby obtaining information data in a valid state.

Alternatively, in step 2, detecting the information status flags by the A core, and determining the validity of the received information data by using the information status flags further comprising: determining that the corresponding information status flag is 1 and the transmitted information data is valid when there is a normal value exists in the received information data.

Alternatively, step 3 further comprising:

Performing task prediction based on the multi-source information time sequence synchronization table and the valid information data obtained in steps 1 and 2, thereby obtaining long-term speed and power demand predicted sequences;

Inputting the long-term speed and power demand predicted sequences in a future driving scene into a dynamic programming model, and performing reverse traversal and forward search based on an operating mode and a set battery power state of the hybrid electric vehicle, thereby obtaining a target battery power state of charge trace sequence in a future driving scene.

Alternatively, step 6 further comprising: determining an energy management strategy according to the initiating condition;

Compared with the prior art, the present invention has the following advantages:

1) According to the present invention, hybrid electric vehicle global energy management is realized only by using environment sensing devices and control devices at a vehicle end, communication interruption caused by adopting the vehicle-end, road-end and cloud-end collaboration scheme is avoided, and the real-time response and driving safety of the hybrid transmission are ensured;
2) According to the present invention, a multi-core heterogeneous controller is used to perform multi-task deployment, which solves the problems caused by one type of tasks requiring high computing power but low real-time response while another type of tasks requiring low computing power but high real-time response, ensures the efficient utilization of control chips of the hybrid transmission, and avoids continuous heating caused by control chips of the hybrid transmission in a high running state;
3) According to the present invention, the multi-step tasks of hybrid electric vehicle global energy management are modularly decoupled, and the energy management strategy is timely switched based on the environment sensing state and the real vehicle performance state, so that the application stability of the hybrid electric vehicle energy management strategy is effectively ensured;
4) The global energy management method of the present invention enables hybrid electric vehicles to achieve the best energy utilization rate during travel, further enhances the energy-saving effect of hybrid electric vehicles, and effectively improves the optimization effect of energy conservation and carbon reduction.

BRIEF DESCRIPTION OF THE DRAWINGS

The drawings are only for the purpose of illustrating specific embodiments and are not intended to limit the present invention.

FIG. 1 is a flow chart illustrating the global energy management optimization method in multi-task cross-core deployment for hybrid electric vehicles.

DETAILED DESCRIPTION

To allow the purposes, features and benefits of the present invention to be better understood, a detailed description of the present invention is provided below in combination with the drawings and specific embodiments. It should be noted that the embodiments of the present invention and the features in the embodiments may be combined with each other without conflict. In addition, to allow the details of the present invention to be better understood, the present invention may also be implemented in other ways different from those described herein. Therefore, the scope of the present invention is not limited by the specific embodiments described below.

In one embodiment of the present invention, referring to FIG. 1, the present invention provides a global energy management system in multi-task cross-core deployment for hybrid electric vehicles, comprising a storage device, an environment sensing device and a control device that are arranged in a hybrid electric vehicle.

The storage device is configured to store a driver's driving speed performance feature data in historical travel big data at a vehicle end and road types corresponding to different speed states, thereby analyzing the driver's driving speed performance features under different scenes (i.e., different road types);

The environment sensing device is configured to obtain scene data and vehicle real-time state data under a global travel, thereby satisfying the analysis need of the global energy management multi-task deployment for electric hybrid electric vehicles;

The control device is configured to perform multi-step computing tasks such as information sensing and time sequence synchronization alignment, scene-oriented driving speed performance analysis, future driving road segment feature recognition, long-time speed and power demand prediction, global SoC trace planning, hybrid transmission operating mode decision-making and control as well as hybrid transmission multi-power-source power allocation, wherein the control device adopts a multi-core heterogeneous controller with a high computing power A core and a high real-time M core;

Alternatively, the storage device is a data storage unit, and there are a plurality of environment sensing devices, which are respectively a vehicle navigation map, an ADAS V2 map, a camera, a radar sensing device and a vehicle-mounted multi-source sensor, wherein the vehicle-mounted multi-source sensor further comprises a pedal displacement sensor, a rotation speed sensor, a torque sensor and a battery state detection sensor; the control device is a multi-core heterogeneous controller with a high computing power A core and a high real-time M core, wherein the A core is responsible for computing tasks with higher computing power demands, and the M core is responsible for computing tasks with higher real-time requirements;

The vehicle navigation map is configured to obtain a road type, a road speed limit, a traffic flow rate and a corresponding road segment length at each position under a global travel, and is used for identifying and analyzing a driving scene, predicting a long-term speed and a power demand, and planning a global SoC trace; the ADAS V2 map is configured to obtain a road type, a road speed limit, a road gradient, a curve curvature and a real-time traffic congestion degree corresponding to each position within a preset travel (3 kilometers), and is used for driving scene recognition and analysis, long-time speed and power demand prediction and global SoC trace planning; the camera and the radar sensing device are configured to obtain the distance between the vehicle and a preceding vehicle in a current lane (the maximum sight distance is 150 meters) and the preceding vehicle type closest to the vehicle for driving scene recognition and analysis; the vehicle-mounted multi-source sensor is configured to obtain vehicle speed, pedal operation performance, wheel end torque demand, battery power state, rotation speeds and torques of different power sources such as an engine, a driving motor and an electric generator, and is used for hybrid transmission operating mode decision-making and control as well as hybrid transmission multi-power-source power allocation task analysis.

Alternatively, different information data collected by the environment sensing device is converged into the multi-core heterogeneous controller through a CAN bus.

In another embodiment of the present invention, based on the aforesaid global energy management system in multi-task cross-core deployment for hybrid electric vehicles, the present invention provides a global energy management optimization method in multi-task cross-core deployment for hybrid electric vehicles, comprising the steps of:

Step 1: inputting a plurality of pieces of online original information collected by a plurality of environment sensing devices into an M core of a multi-core heterogeneous controller, and performing information sensing and time sequence synchronization alignment, scene-oriented driving speed performance analysis and future driving road segment feature recognition, thereby obtaining information data;

Step 11: inputting the plurality of pieces of online original information collected by the plurality of environment sensing devices (the plurality of pieces of online original information collected at the current moment) into the M core of the multi-core heterogeneous controller, and performing time sequence synchronization alignment, thereby obtaining a multi-source information time sequence synchronization table;

Step 111: taking the minimum sampling frequency in the sampling frequencies of the plurality of pieces of online original information collected by the plurality of environment sensing devices as a reference sampling frequency;

Step 112: taking any online original information corresponding to the minimum sampling frequency as reference information, and taking a timestamp corresponding to the reference information as a reference timestamp;

Step 113: constructing a multi-source information time sequence synchronization table based on the reference sampling frequency, the reference information and the reference timestamp, wherein the ordinate is a timestamp, the abscissa is an information type of the online original information, and the value filled in the table is the corresponding online original information obtained after the time sequence synchronization;

Alternatively, taking the reference timestamp as a sampling time point of the multi-source information time sequence synchronization table, extracting data of the nearest sampling time points of the plurality of pieces of online original information, and filling the data at the nearest sampling time points in the multi-source information time sequence synchronization table, thereby realizing the time sequence synchronization alignment.

Step 12: extracting a driver's driving speed performance feature data in the historical travel big data at a vehicle end, and obtaining the driver's driving speed performance matrix in different scenes;

According to the method of the present invention, the driver's driving speed performance in different scenes is analyzed, and by means of extracting the driver's driving speed performance feature data in the historical travel big data at the vehicle end, the driver's historical driving speed performance under different road types is effectively reflected; The driver's speed performance feature data in the historical travel big data at the vehicle end is a driver's driving speed performance coefficient under different road types, which is expressed as:

$$\theta_x = \frac{V_{x\_ave}}{V_{x\_lim}} \quad (1)$$

wherein $\theta_x$ represents a driver's speed performance coefficient under the x-th road type, $V_{x\_ave}$ represents a driver's speed mean value under the x-th road type, and $V_{x\_lim}$ represents a road speed limit of the x-th road type;

Storing the driver's driving speed performance feature data in the historical travel big data at the vehicle end as a driver's driving speed performance matrix;

Alternatively, the road types include urban expressways, urban main roads, urban secondary roads and highways;

Alternatively, the first row of the driver's driving speed performance matrix is a speed mean value, and the second row of the driver's driving speed performance matrix is a speed performance coefficient;

Step 13: integrating the multi-source information time sequence synchronization table and the driver's driving speed performance feature data, thereby obtaining the information data for future driving road segment feature recognition;

Step 131: obtaining a travel global road type, a road speed limit, a traffic flow rate and corresponding global road segment length information through a vehicle navigation map; when a congestion state occurs in a future driving road segment, taking the traffic flow rate at a corresponding position of a future driving road segment as an identifier, and using it as a reference speed at each position in a future driving road segment; when the future driving segment is in a smooth state, taking the speed obtained by multiplying the road speed limit at the corresponding position of the future driving road segment with the speed performance coefficient in the driver's driving speed performance feature data as an identifier, and using it as a reference speed at each position in a future driving road segment;

Step 132: obtaining a reference speed sequence at each position in a future driving road segment corresponding to a current moment, wherein the formula is as follows:

$$v_{ref}=[v_{ref\_offx1}, v_{ref\_offx2}, \ldots, v_{ref\_offxn}] \quad (2)$$

wherein $v_{ref}$ represents a reference speed sequence in a future driving road segment, $v_{ref\_offx1}$ represents a reference speed spaced a first position interval from a current position, $v_{ref\_offx2}$ is a represents a reference speed spaced a second position interval from a current position, and $v_{ref\_offxn}$ represents a reference speed spaced an n-th position interval from a current position;

Alternatively, setting a position interval according to the global road segment length of the future driving road segments, and further, setting the position interval to be 100 meters;

Step 133: synchronizing a gradient and curvature array sequence at each position in a future driving road segment corresponding to a current moment, a reference speed array sequence and data of the multi-source information time sequence synchronization table, thereby obtaining the information data of the vehicle-end real-time information and the future driving road segment feature recognition information;

Alternatively, obtaining a road gradient and a road curvature at each position of a preset travel (3 kilometers) ahead of a current driving position through the ADAS V2 map, and synchronizing the gradient and curvature array sequence at the current moment corresponding to the future driving road segment, the reference speed array sequence and data of the multi-source information time sequence synchronization table, as shown in Table 1:

TABLE 1

Multi-Source Information Time Sequence Synchronization Table and Future Driving Scene Reference Array Sequence

| Reference timestamp | Vehicle speed | Battery SoC | Distance from preceding vehicle | ... | Reference speed sequence in future driving scenes | ADAS V2 reference gradient and curvature array sequence |
|---|---|---|---|---|---|---|
| 1s | 0 km/h | 15.0 | 100 m | ... | [1 × n] | [1 × n] |
| 2s | 3.6 km/h | 15.0 | 99 m | ... | [1 × n − 1] | [1 × n − 1] |
| ... | ... | ... | ... | ... | ... | ... |
| ts | 0 km/h | 15.0 | 0 | ... | [1] | [1] |

Note:
[1 × n] represents that there are N position intervals in a future driving scene;

According to the method of the present invention, the problem relating to different environment sensing devices having different sampling frequencies is solved, and the synchronization of the real-time information and the future driving road segment information is realized;

Step 2: transmitting the information data obtained in step 1 to the A core of the multi-core heterogeneous controller in real time, thereby obtaining information data in a valid state;

Further, transmitting the information analyzed by the M core in step 1 to the A core;

Further, achieving communication between the M core and A core by transmitting message commands in a register interruption manner, and sending the analyzed information data and the information status flags in the information data to the A core by a message transmission unit;

Step 21: preparing the information data by the M core, setting a sending site TX of the message transmission unit of the M core as an empty site, setting a receiving site RX as a full site, and generating an acceptance interruption request;

Step 22: notifying the status register of the A core to prepare to read data by the sending site TX of the message transmission unit, and making the A core respond to the interruption request and starts to read the information data;

Step 23: after the A core reads the information data, resetting the receiving site RX of the message transmission unit to be zero for proving that the information is transmitted, resetting the sending site TX of the message transmission unit to be a full site, and informing the M core that the reading of the information data is completed by the state register;

Step 24: detecting the information status flags by the A core, and determining the validity of the received information data by using the information status flags, thereby obtaining information data in a valid state;

More specifically, when there is a null value in the reference speed sequence in the future driving road segment in the multi-source information time sequence synchronization table, the corresponding information status flag is 0, and the transmitted information data is invalid; when there is a normal value in the multi-source information time sequence synchronization table, the corresponding information status flag is 1, and the transmitted information data is valid;

It should be understood that a normal value is a value within a set data range;

Step 3: obtaining a target battery power state of charge trace sequence under a latest future driving road segment based on the multi-source information time sequence synchronization table and the valid information data obtained in steps 1 and 2;

Performing task prediction based on the multi-source information time sequence synchronization table and the valid information data obtained in steps 1 and 2, wherein the tasks include the prediction of a long-term speed and power demand and a global SoC trace planning;

Further, when the M core does not transmit data to the A core, the A core is in a low power consumption mode, and the target battery power state of charge trace curve under the latest future driving road segment is predicted and output based on the long-term speed and power demand as well as the global SoC trace planning;

Alternatively, predicting the long-term speed and power demand, comprising: performing random sampling in a preset speed range (e.g., [−10 km/h, +10 km/h]) corresponding to the reference speed at each position interval based on a reference speed sequence in a future driving road segment in the multi-source information time sequence synchronization table, thereby forming a long-term speed prediction sequence under a future driving road segment, wherein the formula is as follows:

$$v_{pre}=[v_{pre\_offx1}, v_{pre\_offx2}, \cdots v_{pre\_offxn}]$$

$$v_{pre\_offxn}=\text{Rand}(v_{ref\_offxn}-10 \text{ km/h}, v_{ref_{offxn}}+10 \text{ km/h})$$

wherein $v^{pre}$ represents a predicted speed sequence in a future driving road segment, $v_{pre\_offx1}$ represents a predicted speed spaced a first position interval from a current position, $v_{pre\_offx2}$ is a represents a predicted speed spaced a second position interval from a current position, $v_{pre\_offxn}$ represents a predicted speed spaced an n-th position interval from a current position, and $v_{pre\_offxn}$ represents a reference speed spaced an n-th position interval from a current position, Rand represents a random sampling function for extracting any speed value within a given speed range; the present invention is capable of effectively simulating the variation of speed in a future driving road segment;

Further, obtaining a driving resistance and a corresponding power demand in a future driving scene based on the predicted long-term speed prediction sequence and the resistance fitting curve formula of the hybrid electric vehicle, as shown in formulas (5) and (6):

$$F_{pre}=F_0+F_1v_{pre}^2+F_2v_{pre}^4 \qquad (5)$$

$$P_{pre}=F_{pre} \times v_{pre} \qquad (6)$$

wherein $F_{pre}$ represents a total resistance fitted to the hybrid electric vehicle at different speed states, $F_0$, $F_1$ and $F_2$ respectively represent driving resistance fitting coefficients, wherein the resistance fitting coefficients vary under different vehicle weights, $v_{pre}$ represents a predicted speed sequence in a future driving scene, and $P_{pre}$ represents a predicted power sequence in a future driving scene;

Further, performing global SoC trace planning by using a dynamic programming model, comprising: inputting a predicted speed sequence and a power sequence in a future driving scene into a dynamic programming model, and performing reverse traversal and forward search based on an operating mode and a set battery power state of the hybrid electric vehicle, thereby obtaining a target battery power state of charge trace sequence in a future driving scene, as shown in formula (7):

$$SoC_{pre}=[SoC_{pre\_offx1}, SoC_{pre\_offx2}, \ldots SoC_{pre\_offxn}] \qquad (7)$$

wherein $SoC_{pre}$ ⅓ represents a target battery power state of charge trace sequence in a future driving scene, $SoC_{pre\_offx1}$ represents a target battery power state spaced a first position interval from the current position, $SoC_{pre\_offx2}$ represents a target battery power state spaced a second position interval from the current position, and $SoC_{pre\_offxn}$ represents a target battery power state spaced an n-th position interval from the current position;

Step 4: waking up the target battery power state of charge trace sequence under the latest future driving road segment;

When the driver activates the global energy management function of the hybrid electric vehicle and intervenes in the decision-making and control of the hybrid transmission of the hybrid electric vehicle based on an event triggering mechanism, the M core issues a service-calling request instruction to the A core, wakes up the A core and sends a target battery power state of charge trace curve corresponding to a future driving road segment based on a latest predicted long-time speed prediction sequence;

The A core and the M core perform unidirectional data transmission based on the SOME/IP protocol, the M core sends a service-calling request to the A core, and the A core replies and outputs the target battery power state of charge trace sequence under the latest future driving road segment to the M core; through adopting the SOME/IP protocol for communication, the load of information borne by the bus is effectively reduced;

The event triggering mechanism is mainly based on a fixed time period or a fixed driving mileage, and the triggering is performed once every 10 minutes or 1 kilometer; when a trigger condition of the event trigger mechanism is met, the M core sends a service-calling request instruction to the A core;

Step 5: applying the target battery power state of charge trace sequence under a future driving road segment to the M core by the A core, and determining the battery target SoC state in different position interval states in the future driving road segment based on the driving position, driving speed and driving time at a current position of the hybrid electric vehicle, thereby obtaining a target SoC value in a current position state; subsequently, performing hybrid transmission operating mode decision-making and multi-power-source power allocation in combination with the target SoC value in the current position state, thereby generating a global energy management strategy of the hybrid electric vehicle;

The M core receives the target battery power state of charge trace curve in a future driving scene sent by the A core, and determines the battery target SoC state in different position interval states in the future driving scene based on the driving speed and driving time at the current position of the hybrid electric vehicle, thereby obtaining the target SoC value in the current position state;

Further, the hybrid transmission operating mode decision-making and multi-power-source power allocation are performed in combination with the target SoC value in the current position state, thereby achieving the global energy management of the hybrid electric vehicle;

Alternatively, searching the target battery SoC value in the current position state based on the current position, driving speed and driving time of the hybrid electric vehicle;

more specifically, when the A core sends the target battery power state of charge trace sequence in a future driving scene, the starting point in a latest future driving scene of the hybrid electric vehicle is the starting point vehicle speed $v_0$, the time corresponding to the starting point vehicle speed $v_0$ is the starting time $t_0$, and the vehicle navigation map position corresponding to the starting point vehicle speed $v_0$ is the starting point vehicle navigation map position so; starting to record the predicted driving speed sequence of the hybrid electric vehicle V, $V=[v_0, v_1, v_2, \ldots v_t]$ and the predicted driving time T seconds from the starting point in the latest future driving scene, wherein $v_t$ represents a predicted vehicle speed at the t-th moment, and $t=1, 2, \ldots, T$, wherein T represents a total predicted driving duration; determining a predicted driving distance $s_t$ of the hybrid electric vehicle relative to the starting point vehicle navigation map position; searching for the position interval corresponding to the predicted driving position of the hybrid electric vehicle in the target battery power state of charge trace curve after the total predicted driving time T seconds, and taking the corresponding battery target SoC state as the target SoC value at the current position state;

Alternatively, performing hybrid transmission operating mode decision-making and multi-power-source power allocation in combination with the target SoC value at the current position, wherein the main factors affecting the rule-based hybrid transmission operating mode decision-making and the multi-power-source power allocation scheme include the vehicle speed, pedal opening degree and real-time battery SoC state; on this basis, introducing the target SoC value at the current position, adopting a PI controller and an equivalent minimum fuel consumption method to select an operating mode of the hybrid transmission and allocate the power generated by the power sources, thereby enabling the real-time battery SoC state to follow the target SoC value such that a global energy management strategy for hybrid electric vehicles is generated;

Step 6: determining an energy management strategy according to the initiating condition;

To ensure the stability and safety of hybrid electric vehicle energy management, when a hybrid electric vehicle global energy management condition is met, the hybrid electric vehicle global energy management strategy is initiated, and if not, the hybrid transmission is switched to the rule-based energy management strategy in time;

The automatic initiation of the hybrid electric vehicle global energy management strategy requires that the following conditions are simultaneously met: first, the vehicle navigation map is initiated to output the reference speed sequence under a future driving road segment; second, the M-core performs hybrid transmission operating mode decision-making and multi-power-source power allocation in combination with the target SoC value at the current position, thereby allowing the hybrid electric vehicle global energy management system and the A core to perform hybrid transmission operating mode decision-making and multi-power-source power allocation in combination with the target SoC value at the current position; therefore, the devices of the hybrid electric vehicle global energy management system are capable of effectively communicating with and send data to each other to detect whether the transmitted information data is valid; third, the M core performs hybrid transmission operating mode decision-making and multi-power-source power allocation in combination with the target SoC value at the current position, thereby allowing the hybrid electric vehicle global energy management system to search the valid target SoC value at the current position, wherein when the battery target SoC exceeds a boundary value, it means the battery target SoC is invalid, and normally, the battery SoC ranges from 10% to 95%; if any of the above conditions is not met, the hybrid transmission is switched to a rule-based energy management strategy;

According to the present invention, a multi-core heterogeneous controller having chips with different computing powers is used as a hardware carrier for solving the problem relating to unbalanced computing power demands of different computing tasks of the global energy management; meanwhile, different computing tasks are modularly decoupled to achieve the following benefits: first, reasonable deployment of different computing tasks and real-time cross-core scheduling response; second, timely switching between the global energy management strategy and the rule-based energy management strategy for ensuring the driving safety; moreover, technical problems relating to huge information resources brought by the vehicle navigation map, ADAS V2 map, camera and radar sensing device to the vehicle end controller and various information types of the global energy management tasks caused by the technical progress of the vehicle end sensing devices are solved; the demands for strong cascading logic among multi-step computing tasks of the global energy management including information perception and time sequence synchronization alignment, scene-oriented driving speed performance analysis, future driving road segment feature recognition, long-time speed and power demand prediction, global SoC trace planning, hybrid transmission operating mode decision-making and control, hybrid transmission multi-power-source power allocation are satisfied; in addition, by using dual-core control chips, sufficient computing power is provided to ensure a real-time computing response.

The above is merely a preferred embodiment of the present invention, and the scope of the present invention is not limited to this. Any changes or replacements made by those skilled in the art within the scope of the disclosed technology of the present invention shall fall into the scope defined by the claims of the present invention.

What is claimed is:

1. A global energy management optimization method in multi-task cross-core deployment for hybrid electric vehicles, comprising the steps of:
    step 1: inputting a plurality of pieces of online original information collected by a plurality of environment sensing devices into an M core of a multi-core heterogeneous controller, and performing information sensing and time sequence synchronization alignment, scene-oriented driving speed performance under different paths analysis and future driving road segment feature recognition, thereby obtaining information data, wherein step 1 further comprising:
        step 11: inputting the plurality of pieces of online original information collected by the plurality of environment sensing devices into the M core of the multi-core heterogeneous controller, and performing time sequence synchronization alignment, thereby obtaining a multi-source information time sequence synchronization table;
        step 12: extracting a driver's driving speed performance under different paths feature data in the historical travel big data at a vehicle end, and obtaining the driver's scene-oriented driving speed performance matrix;
        step 13: integrating the multi-source information time sequence synchronization table and the driver's driving speed performance under different paths feature data, thereby obtaining the information data for future driving road segment feature recognition;
    step 2: transmitting the information data obtained in step 1 to the A core of the multi-core heterogeneous controller in real time, thereby obtaining information data in a valid state;
    step 3: obtaining a target battery power state of charge trace sequence under a future driving road segment based on the multi-source information time sequence synchronization table and the valid information data obtained in steps 1 and 2, wherein step 3 further comprising: performing task prediction based on the multi-source information time sequence synchronization table and the valid information data obtained in steps 1 and 2, thereby obtaining long-term speed and power demand predicted sequences; inputting the long-term speed and power demand predicted sequences in a future driving scene into a dynamic programming model, and performing reverse traversal and forward search based on an operating mode and a set battery power state of the hybrid electric vehicle, thereby obtaining a target battery power state of charge trace sequence in a future driving scene;
    step 4: waking up the target battery power state of charge trace sequence under the latest future driving road segment;
    step 5: applying the target battery power state of charge trace sequence under a future driving road segment to the M core by the A core, and determining the battery target SoC state in different position interval states in the future driving road segment based on the driving position, driving speed and driving time at a current position of the hybrid electric vehicle, thereby obtaining a target SoC value in a current position state; subsequently, performing hybrid transmission operating mode decision-making and multi-power-source power allocation in combination with the target SoC value in the current position state, thereby generating a global energy management strategy of the hybrid electric vehicle.

2. The global energy management optimization method in multi-task cross-core deployment for hybrid electric vehicles of claim 1, wherein in step 2, obtaining the information data in a valid state further comprising: detecting a plurality of information status flags in the information data by the A core, and determining the validity of the received information data by using the plurality of information status flags, thereby obtaining the information data in a valid state.

3. The global energy management optimization method in multi-task cross-core deployment for hybrid electric vehicles of claim 2, wherein in step 2, detecting the plurality of information status flags by the A core, and determining the validity of the received information data by using the plurality of information status flags further comprising: determining that the corresponding information status flag is 1 and the transmitted information data is valid when there is a normal value exists in the received information data.

4. The global energy management optimization method in multi-task cross-core deployment for hybrid electric vehicles of claim 3, wherein the method further comprises step: determining an energy management strategy according to the initiating condition.

5. The global energy management optimization method in multi-task cross-core deployment for hybrid electric vehicles of claim 2, wherein the method further comprises step: determining an energy management strategy according to the initiating condition.

6. The global energy management optimization method in multi-task cross-core deployment for hybrid electric vehicles of claim 1, wherein the method further comprises step: determining an energy management strategy according to the initiating condition.

\* \* \* \* \*